United States Patent [19]
Delisle et al.

[11] 3,775,245
[45] Nov. 27, 1973

[54] DEVICE FOR LOCATING A FUEL ASSEMBLY CAN FAILURE IN A NUCLEAR REACTOR

[75] Inventors: Jean-Paul Delisle, Manosque; Alain Rulleau, Pertuis; Lucien Prouteau, Maurepas, all of France

[73] Assignee: Commissariat A L'Energie Atomique, Paris, France

[22] Filed: Sept. 21, 1971

[21] Appl. No.: 182,315

[30] Foreign Application Priority Data
Sept. 22, 1970 France .............................. 7034315

[52] U.S. Cl. ............................................ 176/19 LD
[51] Int. Cl. ............................................ G21c 17/04
[58] Field of Search .................... 176/19 R, 19 LD

[56] References Cited
UNITED STATES PATENTS
3,612,860 10/1971 Hackney ................................ 176/19
3,219,536 11/1965 Butler et al. .......................... 176/19
2,979,451 4/1961 Pettinger ............................... 176/19

FOREIGN PATENTS OR APPLICATIONS
215,735 6/1958 Great Britain ................. 176/19 LD
1,283,161 12/1961 France ............................ 176/19 LD Primary Examiner—Reuben Epstein
Attorney—Joseph M. Lane et al.

[57] ABSTRACT

The device comprises a plate for the distribution of tubes which serve to sample the coolant within all the fuel assemblies, a first selector which is mounted above the distribution plate and traversed by ducts for providing a communication between a number of sampling tubes and a second selector which is mounted above the first selector. The ducts are connected either individually or simultaneously to a measuring apparatus by means of the second selector. Both selectors are supported by a removable neutron shield plug.

13 Claims, 7 Drawing Figures

DEVICE FOR LOCATING A FUEL ASSEMBLY CAN FAILURE IN A NUCLEAR REACTOR

Operational safety of nuclear reactors is dependent on the need to ensure that any fault condition and particularly any fuel assembly can failure is immediately detected and especially located in order to permit discharge of faulty assemblies as rapidly as possible.

In consequence, provision is usually made in nuclear reactors for a continuous detection system which indicates any abnormal radioactivity and for a fault-locating system which is started up when a fault condition or defect is indicated and makes it possible to determine the position of this latter. The locating and detecting operations are both carried out by sampling the gaseous fission products or the coolant itself and analyzing their activity. Sampling tubes and pumping systems are therefore mounted between each detection and location system and the reactor assemblies, thus constituting a relatively complex and cumbersome arrangement.

The aim of this invention is to simplify the safety system by providing a device which is intended to permit location of a can failure in fuel assemblies while at the same time carrying out general detection and providing the further possibility of locating either on a group of fuel assemblies or on any individual assembly. The operations are thus simplified and only defective fuel assemblies are removed.

This invention is in fact directed to a device for locating a fuel assembly can failure which comprises a plate for the distribution of tubes which serve to sample the coolant within all the fuel assemblies and above said plate a first selector which is traversed by ducts providing a communication between a number of sampling tubes and a second selector which connects said ducts either separately or simultaneously to a measuring unit, said two selectors being supported by a removable neutron shield plug.

The choice of positions of the two selectors makes it possible to analyze the sampled fluid within a predetermined number of fuel assemblies which have known positions and either at the same time or individually.

In accordance with a further characteristic feature of the invention, the device comprises around the selectors an open casing for mixing the fluid which has passed freely through the distribution plate and within said plate a tube for sampling the fluid from each fuel assembly and tubes for sampling the mixture within the casing which are identical in number with the ducts of the first selector.

A judicious choice of the position of the selectors thus makes it possible to analyze the entire quantity of fluid which is sampled from all the fuel assemblies in order to detect any possible can failure or to locate a failure in a group of assemblies and even in one well-determined assembly.

In a device of this type, the measurement can be carried out by monitoring the radioactivity of fission products which are entrained by the coolant liquid after degassing of this latter. An alternative method consists in measuring the delayed neutrons which are entrained by said coolant liquid.

In fact and in accordance with another characteristic feature of the invention, the removable shield plug supports a vessel for monitoring the delayed neutrons which are transported by the sampled liquid coolant, a pump for circulating said liquid and a duct for returning the analyzed liquid into the reactor tank.

The aforesaid plug can also support a box for degassing the sampled coolant, said box being fitted with a pipe through which is admitted a gas for the entrainment of gaseous fission products towards the measuring unit and a pipe for returning the liquid into the reactor tank.

The complete device is supported by a removable shield plug placed within an opening which closes the reactor tank and is entirely placed between said plug and the reactor core, thereby considerably reducing the overall space requirements of the device and permitting wholly independent operation of this latter with respect to the reactor.

The different advantages and properties of the invention will in any case become apparent from the following description of one embodiment which is given by way of non-limitative example and illustrated in the accompanying drawings, in which.

The example of construction which is illustrated relates to a fast reactor cooled by a liquid metal such as sodium in which the reactor core is placed within a tank containing said coolant. However, it is wholly apparent that this application is given solely by way of indication and that the invention is equally well suited to other types of reactors.

Figure 1:
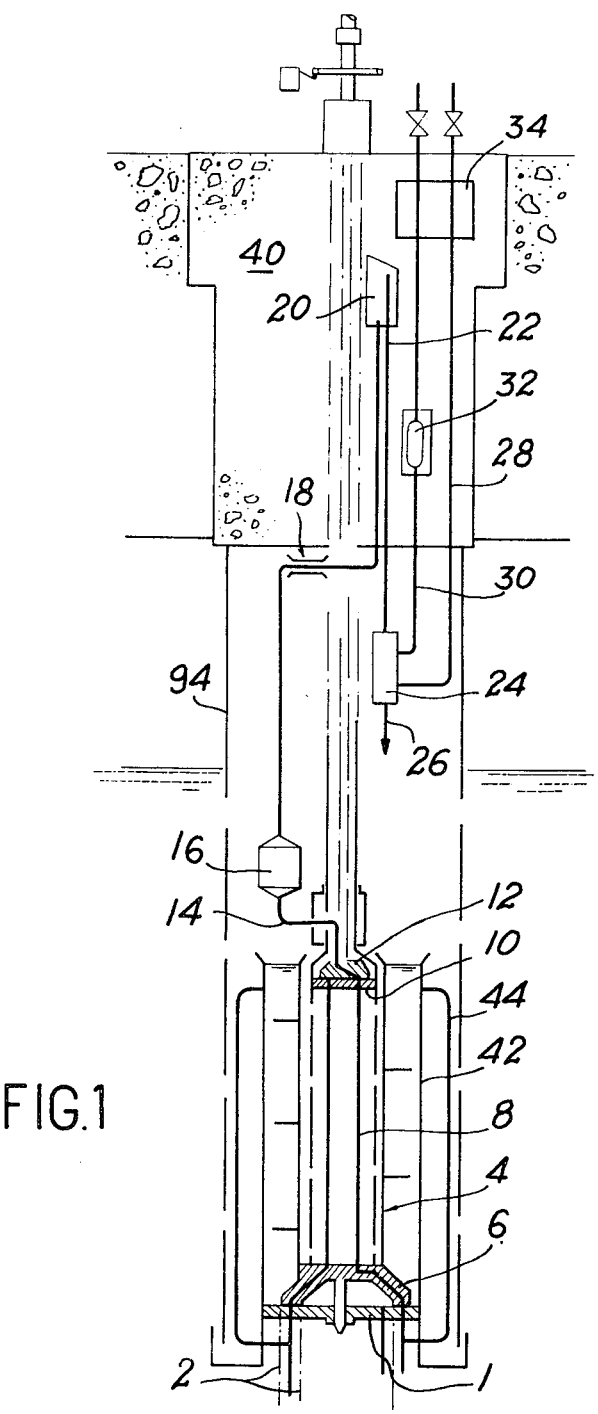
FIG. 1 is a general diagrammatic view of a device for locating can failures.

The device for locating can failures is disposed as shown in FIG. 1 within the tank which contains the coolant liquid. Below the level of said liquid, the device comprises a distribution plate 1 in which are fixed sampling tubes 2, each tube being connected to the outlet of a fuel assembly of the reactor core. Above said plate 1, a first rotary selector 4 comprises a number of suction members 6. By way of example, provision may be made for three suction members and these latter are extended by ducts 8 which are secured to a flange plate 10, said plate being parallel to the distribution plate 1 and intended to support a second selector 12. Said second selector comprises a plurality of orifices which make it possible according to the position of these latter above the ducts 8 to connect these latter either simultaneously or alternately to a pipe 14 which passes through an electromagnetic pump 16, then through a flow meter 18, and which opens into an analytical reservoir 20. A pipe 22 which provides an outlet from said reservoir 20 extends into a degassing box 24 and this latter permits separation of the coolant liquid which flows back to the reactor tank at 26 from the gaseous fission products which are entrained by said coolant. A neutral gas such as argon, for example, is introduced through a pipe 28 into the degassing box 24 and flows in the direction opposite to the liquid. Said gas in fact carries the fission products through a pipe 30 providing an outlet from said box up to a purification chamber 32, then to a unit 34 for measuring the radioactivity of said fission products.

The assembly which consists of the analytical reservoir 20, measuring unit 34, degassing box 24, gas lines 28, 30 and other devices is attached to a removable shield plug 40 and this latter serves to seal-off an opening in the top wall of the enclosure which forms the reactor tank. Said plug also supports the devices employed for driving the two selectors 12 and 4 and consequently supports the selectors themselves.

In a nuclear reactor of the type herein described, the coolant liquid easily reaches the distribution plate 1 and even the second selector 12 solely under the action of its pressure.

Depending on the position of the selector 4, three of the sampling tubes 2 are connected by means of the suction members 6 and the ducts 8 to the small selector 12 and through this latter to the liquid-analyzing device 20 and to the gas-analyzing unit 34. By adjusting the position of said second selector 12, it is thus possible to monitor the three sampling tubes which are chosen simultaneously or individually and consequently to locate a failed can in a group of fuel assemblies or in any particular assembly.

In addition, the two selectors are placed within a casing 42 which is secured to the distribution plate 1 but open at the top end. The sampling tubes which are not extended by the suction members 6 open into said casing so that the liquid which is admitted through all the tubes aforesaid is accordingly mixed. Pipes 44 which are equal in number to the suction members 6 (that is to say three pipes in the example described) open into the distribution plate 1 in the same manner as the other sampling tubes and serve to draw-off said liquid mixture near the top portion of the casing 42. The device can thus operate as a general detector when the three suction members 6 of the selector 4 are located opposite to the orifices of the three pipes 44 in the plate 1. The liquid derived from all the tubes 2 which correspond to the fuel assemblies flows freely through the plate 1 and is then mixed within the casing 42. This mixture is then withdrawn through the pipes 44 and guided through the suction members 6 and the three ducts 8 towards three orifices of the small selector 12 through which the mixture is permitted to pass towards the analytical devices 20 and 34.

Figure 3:
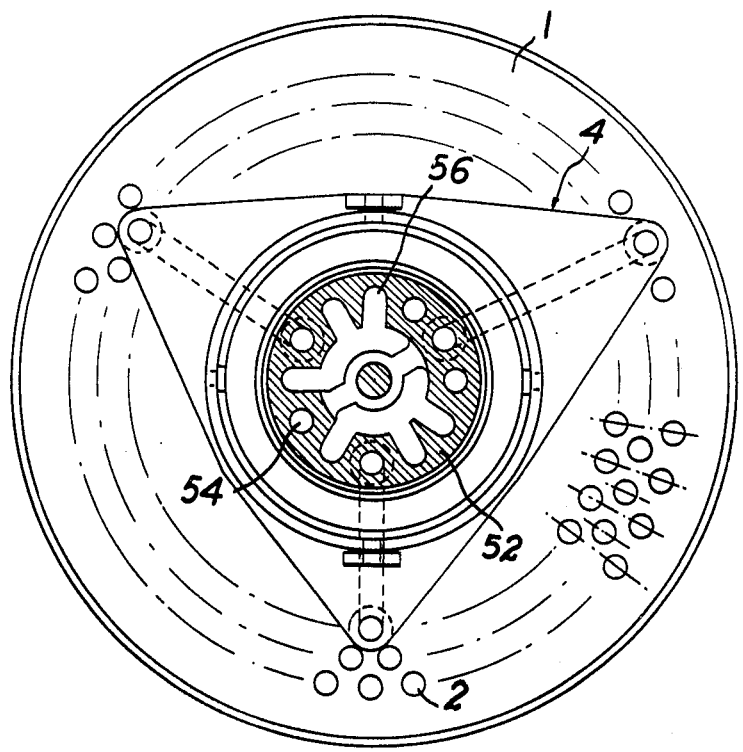
FIG. 3 is an enlarged sectional view taken along line I—I of FIG. 2.

When the large selector has three suction members 6 as in the embodiment which is illustrated, the sampling tubes 2 which are connected to the channels of the reactor core as well as the tubes which are connected to the pipes 44 are disposed on the plate 1 in three coaxial rings and the three suction members 6 are placed at different distances from the axis of the assembly so that each suction member should correspond to one of said rings (as shown in FIG. 3).

Figure 2:
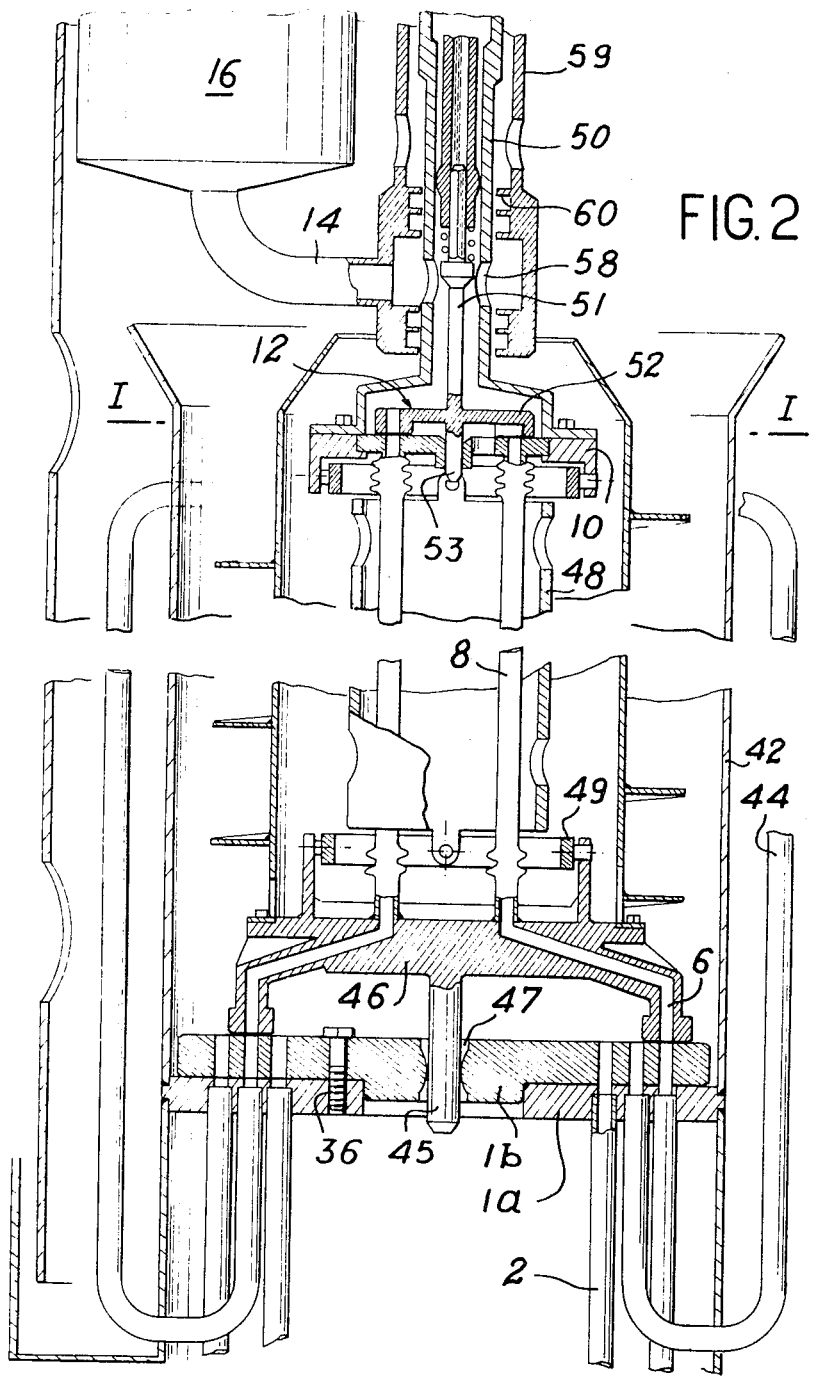
FIG. 2 is a view on a larger scale showing all the selection systems of said device.

The distribution plate 1 is preferably constituted as shown in FIG. 2 by a core plate 1a which is rigidly fixed to the reactor core and in which all the sampling tubes 2 are fixed. Said plate 1a has a central hollowed-out portion and supports a base plate 1b which is pierced by orifices each corresponding to one of the sampling tubes 2 and which is rigidly fixed to the plate 1a by means of screws 36.

The mixing casing 42 is fixed on the periphery of the core plate 1a. Within the interior of said casing 42, the first or large selector 4 has a bottom plate 46 of substantially triangular shape, each vertex of the triangle being extended by one of the suction members 6. Shoes which are not illustrated permit frictional contact between said suction members and the base plate 1b whilst a pin 45 which is integral with the bottom selector plate 46 and is rotatably mounted within an orifice 47 of the plate 1b ensures strictly accurate centering of the assembly in rotary motion. The three ducts 8 are supported at their lower ends by the bottom selector plate 46 and at their upper ends by the flange plate 10, said selector plate 46 and flange plate 10 being connected to each other by means of a perforated sleeve 48 which is pivotally mounted at both ends by means of cardan-type coupling systems 49. In addition, the flange plate 10 is supported by a tube 50 which is connected to a drive mechanism through the removable plug 40. Said tube 50 surrounds a rod 51 for actuating the small selector 12, said rod being fixed at the center of the plate 52 of said small selector. As shown in FIG. 3, the selector plate 52 has a bottom extension in the form of a pin 53 which serves to center said selector plate in the flange plate 10. Said selector plate 52 is pierced by six holes 54, three of which are located at the same intervals as the ducts 8 and can each correspond simultaneously to one of the three ducts 8 (as shown in FIG. 3) in order that the entire quantity of fluid collected by the large selector 4 should be permitted to pass into the tube 50 which communicates with the duct 14. The three other holes 54 are spaced differently and make it possible to put only one of the ducts 8 into communication with the tube 50 and the measuring unit. Radial grooves 56 which are also six in number are formed in the underface of the top selector plate 52, namely in that face which is located opposite to the flange plate 10, and permit the fluid which is admitted through the ducts 8 to return through an orifice of the flange plate 10 towards the sleeve 48 and the reactor tank.

The tube 50 is placed within a guide sleeve 59 which supports the duct 14 and ports 58 are formed in said tube in order to provide a communication with said duct 14 for discharging the liquid in the direction of the pump 16 and measuring units. On each side of said ports 58, the guide sleeve 59 carries labyrinth seals 60 which prevent leakage of the liquid.

The guide sleeve 59 extends into the shield plug 40 and permits free rotation of the tube 50 and rod 51 with respect to said plug. Said tube 50 and rod 51 are in fact designed to extend beyond the shield plug and are driven from the exterior of the reactor. Rotary motion is imparted to said tube and rod by means of a jack 62–63 (shown in FIG. 7), said jack being intended to actuate an arm 66–67 which carries a pawl 68–69 and this latter being engaged with the teeth of a ratchet-wheel 70. Said wheel 70 is rigidly fixed to a sleeve 71 and this latter is provided at the lower end with teeth 72 which are capable of engaging with corresponding teeth 73 formed on that extremity of the tube 50 which is rigidly fixed to the first selector 4. Beneath said teeth 73, the tube 50 supports a skirt 74 which terminates in driving dogs 82 whilst an annular member 80 which is rigidly fixed to said shield plug 40 is provided with a series of recesses which are intended to receive said dogs 82. Furthermore, the tube 50 is coupled to the rod 51 for vertical displacement with this latter by means of thrust-bearings 78, said rod 51 being connected to the piston 88 of a lifting jack 90.

Figure 7:
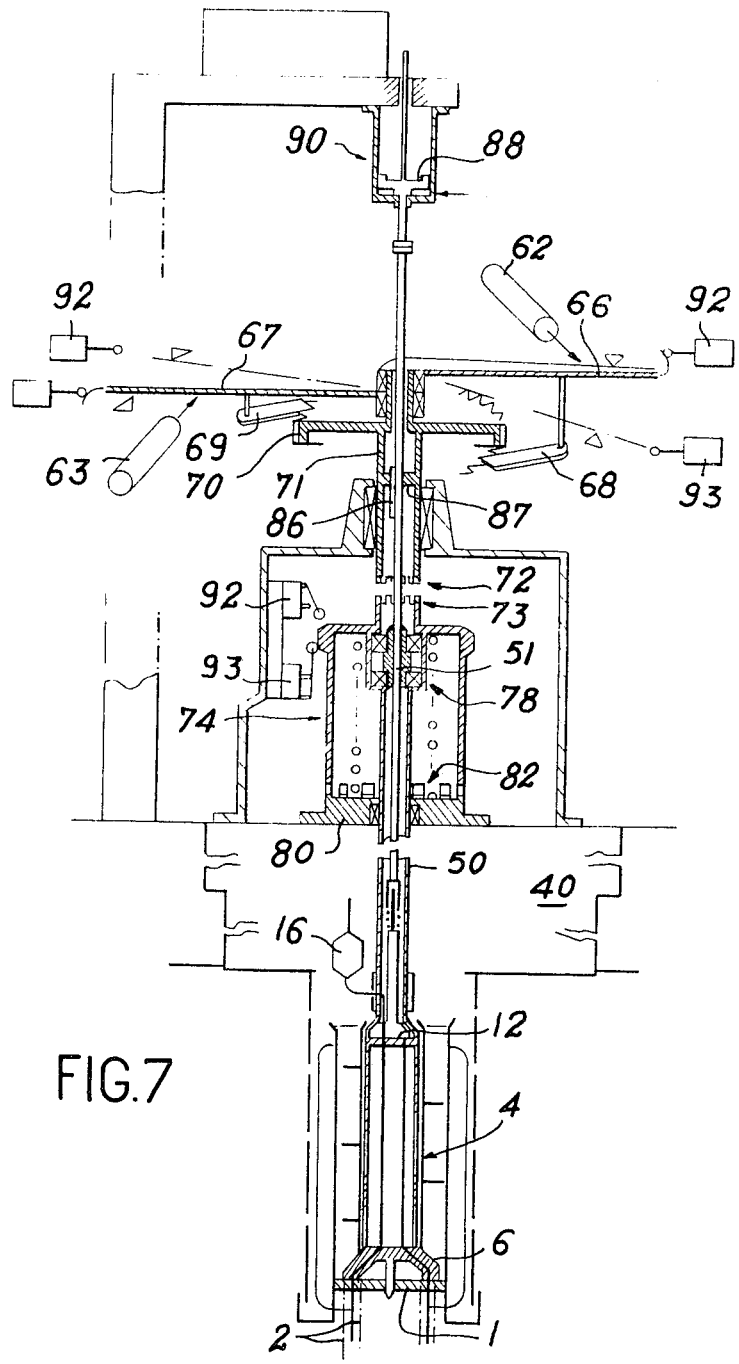
FIG. 7 is a diagram of the selector control mechanism.

The sleeve 71 also has an internal ring 87 provided with recesses which are intended to cooperate with a key 86 carried by the rod 51 in order that this latter should be coupled to the ratchet-wheel 70. In FIG. 7, the jack 90 is shown in the bottom position whilst the key 86 is engaged with the ring 87 and accordingly couples the rod 51 to the ratchet-wheel 70. The tube 50 is in the bottom position and rigidly fixed for rotation by means of the driving dogs 82. The selector 4 is applied against the base plate 1 and the sets of teeth 72 and 73 are separated from each other. The jack 62 can therefore initiate the rotary motion of the selector 12 alone and the change of position of the holes 54 with respect to the ducts 8. On the other hand, when the piston 88 is lifted, the key 86 secures the rod 51 and consequently the selector 12 to the ratchet-wheel 70, whereupon the skirt 74 and the tube 50 are lifted and coupled to the tube 71 by means of the driving dogs 72 and 73. The dogs 82 are located at a distance from each other. The jack 63 can therefore initiate the simultaneous rotation of the selectors 4 and 12. Each displacement of a jack 62 or 63 causes the ratchet-wheel 70 to rotate over an angular distance corresponding to a predetermined number of teeth. The number of teeth of said ratchet-wheel 70 is therefore chosen so as to permit sweeping of all the positions of each selector. For example, when the distribution plate carries three rings of 42 tubes 2 and the top selector plate 52 has six holes and six grooves, the ratchet-wheel has 84 teeth. The jack 63 causes the ratchet-wheel to rotate over an angular distance of seven teeth or in other words initiates a displacement of the small selector corresponding to one half of a revolution whilst the action of the jack 62 produces a rotation of two teeth, that is to say one forty-second of a revolution.

For the sake of enhanced safety, limit microswitches 92–93 are placed at each end of travel of the arms 66–67 as well as in the top and bottom positions of the skirt 74.

The control means just mentioned permit rotation of one of the two selectors 4 and 12 when the other is immobilized but also permits simultaneous displacement of the selectors when these latter are both lifted by virtue of the engagement on the one hand of the teeth 72 and 73 and on the other hand of the key 86 and the ring 87.

Figure 6:
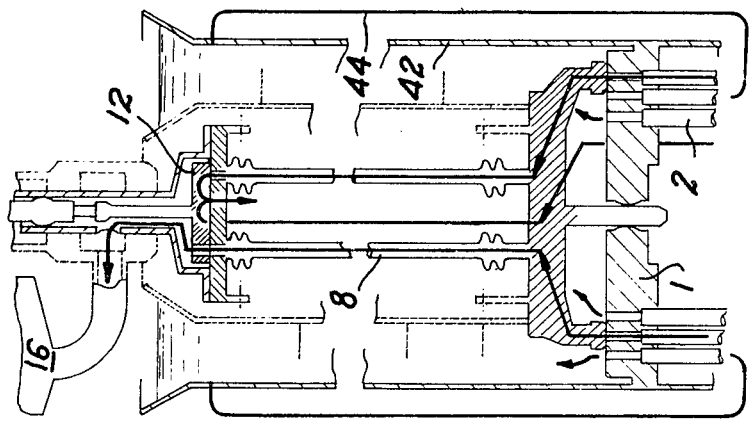
FIGS. 4, 5 and 6 show diagrammatically the relative positions of the two selectors of FIG. 2 in three different modes of operation.
Figure 5:
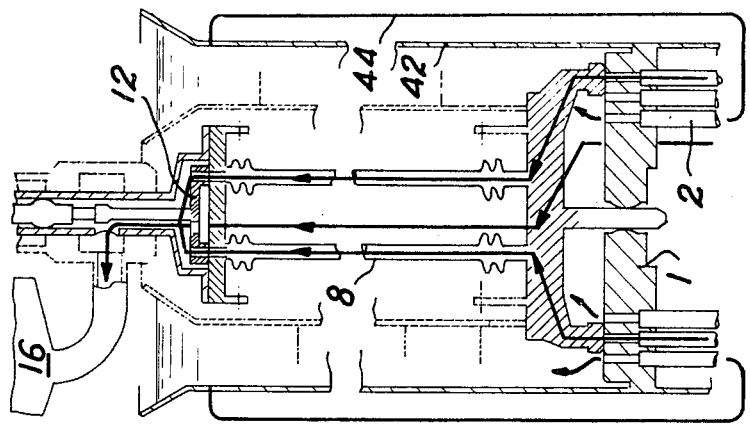
Figure 4:
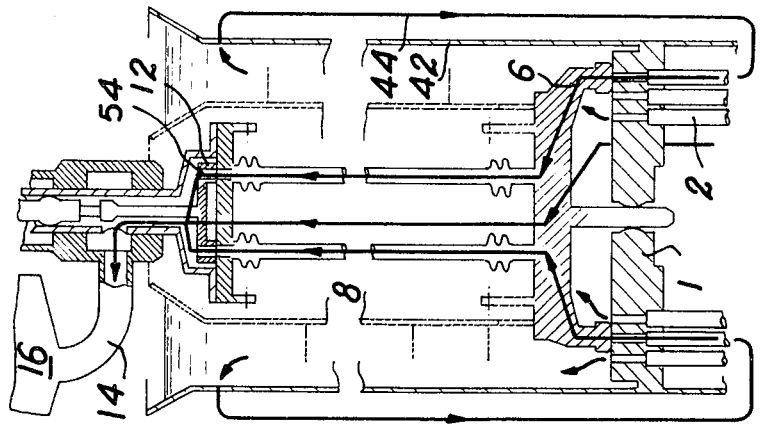

Depending on the position of the two selectors, the device can operate in three different ways as shown respectively in FIGS. 4, 5 and 6.

In FIG. 4, the device operates as a detector. The suction members 6 of the selector 4 are each coupled to one of the pipes 44 whilst the three ducts 8 are all put into communication with orifices 54 of the selector 12. The entire quantity of fluid collected by the tubes 2 which are coupled to the reactor channels therefore passes through the distribution plate 1 in order to penetrate into the casing 42, whereupon part of the mixture contained in this chamber is in turn drawn-off through the pipes 44 in order to be conveyed to the suction members 6 and through the selector 1 to the duct 14, that is to say successively to the analytical device 20, to the degassing box 24 and to the measuring unit 34. A warning signal is given to indicate any leakage which may develop, that is to say as a result of a can failure in a fuel assembly at any point of the reactor but the leak must then be located. This location can readily be achieved by placing the selectors in the position shown in FIG. 5 or in the position of FIG. 6.

FIG. 5 in fact shows the device in the position of location on groups of fuel assemblies. In this case, the selector 4 is connected to three sampling tubes 2 which each correspond to one fuel assembly channel. On the other hand, the selector 12 remains in the same position as in FIG. 4 or, in other words, permits the entire quantity of fluid collected by the first selector to pass towards the analytical devices 20 and 34. Any abnormal activity which is detected by either of these devices therefore originates from one of the three assemblies being monitored, that is to say from a relatively small area.

Precise location is in turn ensured by displacement of the selector 12 in the position shown in FIG. 6 in which two of the ducts 8 are connected by said selector to the return towards the reactor tank whilst a single orifice 54 puts the third duct 8 into communication with the duct 14 which leads to the analytical devices. A single well-determined fuel assembly is therefore monitored and the can failure is located with accuracy.

The assembly which comprises the drive mechanism and the selectors is carried by the removable shield plug 40 and may consequently be displaced at the same time as this latter. A perforated skirt 94 (shown in FIG. 1) is fixed beneath the removable plug and surrounds all the selectors and liquid and gas circuits. Said skirt not only ensures the protection of these components but additionally permits centering of the assembly at the time of positioning of this latter within the reactor.

The device therefore permits accurate location of any can burst or failure which may develop but can also ensure under normal operating conditions continuous detection of any fault condition in any one fuel assembly. The changeover from one function to the other is carried out simply by displacing one or both selectors and this can be done in a very short time. Even in the absence of any abnormal activity, monitoring on a group of assemblies or on any one assembly is preferably carried out periodically. Highly accurate and complete monitoring is also achieved by virtue of the double analysis of the liquid and of the gaseous fission products which are entrained by this latter. Potential danger of accident is consequently very limited despite the small number of operations involved in detection and location which are necessary in order to ensure operational safety.

Moreover, provision need not be made for any pumping system at the outlet of the channels which contain the fuel assemblies. The dynamic pressure of the coolant liquid is alone necessary to bring this latter into the device. Said device is wholly placed between the reactor core and the sealing slab. The device can therefore readily be protected, permits independent operation with respect to said reactor and can easily be disassembled.

It will be clearly understood that a number of different modifications could be made in the embodiment which has just been described without thereby departing either from the scope or the spirit of the invention. For example, provision could be made for a different number of suction members or of holes and grooves of the selector 12.

What we claim is:

1. A device for detecting and locating a fuel can failure, comprising flow path means for circulating coolant past a plurality of fuel cans, the flow path means including a separate first flow path leading from each of the fuel cans, the ends of the first flow paths being arranged in more than one definable configuration, first selector means, second selector means, and a measuring unit, the first selector means including first communicating means for selectively communicating one of the first flow paths in each configuration to the second selector means and all of the first flow paths in all of the configurations to the second selector means, the second selector means including second communicating means for selectively communicating all of the first flow paths communicated by the first selector means to the measuring unit and one of the first flow paths communicated by the first selector means to the measuring unit.

2. The device in claim 1, wherein the first selector means includes a casing communicating with all of the first flow paths, and a second flow path for each configuration, one end of each of the second flow paths being connected to the casing and the other end being included in its respective configuration.

3. The device in claim 2, wherein the ends of the first and second flow paths are arranged in a plurality of concentric circles.

4. The device in claim 3, wherein the first selector means includes a member rotatably movable about the commom center of the circles, the member including a passageway for each circle, the passageways being positioned and dimensioned so that one end of each passageway cooperates with the end of the flow path in its respective circle for communicating one flow path at a time with the second selector means, and means for moving the member.

5. The device in claim 4, wherein the ends of the first and second flow paths are arranged in three concentric circles.

6. The device in claim 5, wherein the member includes three arms, each arm projecting to a separate circle, one of the passageways located in each arm.

7. The device in claim 6, wherein the ends of the passageways that communicate with the flow paths are spaced apart 120° from each other, and the second flow paths are spaced apart 120° from each other, so that the passageways can communicate simultaneously with the second flow paths for enabling coolant to flow from all of the first flow paths simultaneously to the second selector when the member is stationary.

8. The device in claim 4, wherein the second selector means includes a member having a plurality of openings therein cooperating with the other ends of the passageways, the openings permitting coolant to flow to the measuring unit when communicating with a passageway, a first set of said openings positioned and dimensioned to communicate all the passageways simultaneously with the measuring unit when the member is in the first position, and a second set of said openings positioned and dimensioned to communicate the passageways one at a time with the measuring unit when the member is moved from the first position to a number of said positions corresponding to the number of configurations, and means for moving the member.

9. The device in claim 8, wherein the other ends of the passageways are arranged in a circle, and the member includes a plate rotatably movable about the center of said circle.

10. The device of claim 9, wherein there are three passageways.

11. The device in claim 10, wherein the other ends of the passageways are spaced apart 120° from each other, the openings in said first set are spaced apart 120° from each other, and the openings in the second set are staggered between the openings in the first set.

12. The device in claim 1, further comprising a ratchet wheel, two jacks for driving the ratchet wheel, each jack having a different range of travel, and means for selectively connecting the ratchet wheel to the first and second selector means.

13. The device in claim 12, wherein the means for selectively connecting includes means for lifting each selector means so that each selector means can be disengaged from its support and coupled with the ratchet wheel.

* * * * *

UNITED STATES PATENT OFFICE
CERTIFICATE OF CORRECTION

Patent No. 3,775,245              Dated November 27, 1973

Inventor(s) Jean-Paul Delisle et al

It is certified that error appears in the above-identified patent and that said Letters Patent are hereby corrected as shown below:

Column 5, line 33, "one half" should read -- 1/12 --.

Signed and sealed this 23rd day of April 1974.

(SEAL)
Attest:

EDWARD M. FLETCHER, JR.                C. MARSHALL DANN
Attesting Officer                      Commissioner of Patents